(12) United States Patent
Itai (10) Patent No.: US 10,501,000 B2
(45) Date of Patent: Dec. 10, 2019

(54) TRANSPORTATION VEHICLE

(71) Applicant: Hitachi Construction Machinery Co., Ltd., Taito-ku, Tokyo (JP)

(72) Inventor: Yudai Itai, Ibaraki (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 16/081,245

(22) PCT Filed: Jun. 1, 2017

(86) PCT No.: PCT/JP2017/020522
§ 371 (c)(1),
(2) Date: Aug. 30, 2018

(87) PCT Pub. No.: WO2018/051582
PCT Pub. Date: Mar. 22, 2018

(65) Prior Publication Data
US 2019/0009702 A1 Jan. 10, 2019

(30) Foreign Application Priority Data
Sep. 16, 2016 (JP) ................................. 2016-182237

(51) Int. Cl.
*B60P 1/16* (2006.01)
*F15B 11/20* (2006.01)
(Continued)

(52) U.S. Cl.
CPC ................ *B60P 1/16* (2013.01); *F15B 11/20* (2013.01); *B60P 1/162* (2013.01); *F15B 11/08* (2013.01);
(Continued)

(58) Field of Classification Search
CPC .. B60P 1/162; B60P 1/16; B60P 1/045; B60P 1/28; F15B 11/08; F15B 13/0401;
(Continued)

(56) References Cited

U.S. PATENT DOCUMENTS

| 4,175,906 A | * | 11/1979 | Johnston | ................... | B60P 1/58 298/1 V |
| 5,659,470 A | * | 8/1997 | Goska | ................... | G01G 19/10 177/141 |

(Continued)

FOREIGN PATENT DOCUMENTS

| JP | 59-18033 A | 1/1984 |
| JP | 2011-225111 A | 11/2011 |

(Continued)

OTHER PUBLICATIONS

International Search Report (PCT/ISA/210) issued in PCT Application No. PCT/JP2017/020522 dated Jul. 4, 2017 with English translation (two (2) pages).
(Continued)

*Primary Examiner* — Behrang Badii
(74) *Attorney, Agent, or Firm* — Crowell & Moring LLP (57) ABSTRACT

A haulage vehicle includes a vessel 3, hoist cylinders 10, a control valve device 16 that controls a supply or discharge of pressurized oil to or from the hoist cylinders 10, a controller 35, and a tilt angle detector 31 that detects a tilt angle of the vessel 3. The controller 35 compares a down assist performing angle, which is a tilt angle preset to determine whether negative pressure control processing needs to be performed for offsetting a force applied in a direction that would cause the hoist cylinders 10 to extend, with the detected tilt angle and, if the detected tilt angle is determined to be equal to or greater than the down assist performing angle, outputs a control valve signal to the control valve device 16 so that the valve is opened to
(Continued)

forcibly discharge pressurized oil from the hoist cylinders 10.

3 Claims, 6 Drawing Sheets

(51) Int. Cl.
    *F15B 11/08*     (2006.01)
    *F15B 13/04*     (2006.01)

(52) U.S. Cl.
    CPC .......... *F15B 13/04* (2013.01); *F15B 13/0401* (2013.01); *F15B 2211/413* (2013.01); *F15B 2211/6654* (2013.01); *F15B 2211/7053* (2013.01); *F15B 2211/7107* (2013.01); *F15B 2211/781* (2013.01)

(58) Field of Classification Search
    CPC ........ F15B 13/044; F15B 13/04; F15B 11/20; F15B 2211/413; F15B 2211/6654; F15B 2211/7053; F15B 2211/7107; F15B 2211/781; G01G 19/08; G01G 19/10; G05D 1/0088; G05D 1/0214; G05D 1/0223; G05D 1/0278; G05D 1/0297; G05D 1/0022; E02F 3/304; E02F 3/46; E02F 9/2016; E02F 3/435; E02F 3/30; E02F 3/425; E02F 9/265; F04B 23/14; F04B 23/10; G07C 5/08; G07C 5/00; G01M 17/007; G01M 1/12; F04C 11/005; F04D 13/14; F04D 13/12; F04D 15/0072; F02M 63/0225; F02M 37/22; F02M 37/0052; F02M 37/18
See application file for complete search history.

(56) References Cited

U.S. PATENT DOCUMENTS

2004/0011427 A1*   1/2004   Liu ................. A01G 23/08
                                                             144/34.1
2016/0362034 A1*   12/2016   Fushiki ................. B60P 1/162

FOREIGN PATENT DOCUMENTS

JP           2017-94859 A     6/2017
WO     WO 2011/135959 A1   11/2011

OTHER PUBLICATIONS

Japanese-language Written Opinion (PCT/ISA/237) issued in PCT Application No. PCT/JP2017/020522 dated Jul. 4, 2017 (three (3) pages).

* cited by examiner

TRANSPORTATION VEHICLE

TECHNICAL FIELD

This invention relates to a haulage vehicle, and especially to the stability of operation during ejection of a payload.

BACKGROUND ART

As a technology for improving the stability of operation during ejection from a haulage vehicle with a vessel mounted on a vehicle frame, Patent Document 1 discloses a configuration that, "when a vessel is lowering in a loaded state, controls switching of a directional control valve to reduce the speed of retraction of hoist cylinders, whereby an impact of a vessel on a vehicle frame is avoided" (extracted from the Abstract).

PRIOR ART DOCUMENT

Patent Document

Patent Document 1: WO 2011/135959 A

DISCLOSURE OF THE INVENTION

Problem to be Solved by the Invention

Upon ejection of a payload from a vessel, the ejection may be performed while a haulage vehicle is moving forward at a low speed. In this case, by an inertial force associated with the forward movement of the haulage vehicle and shifting of the center of gravity of the payload to a lower end part of the tilted vessel, a pivotal force acts in a direction that the tilt angle of the vessel increases further, whereby hoist cylinders are pulled further in an extending direction. There is, accordingly, a potential problem that the vessel may be disconnected from the hoist cylinders. Patent Document 1 can mitigate an impact applied to the vehicle frame upon resting of the vessel on the vehicle frame after completion of ejection of a payload, but a problem remains unsolved in that effects of a force, which acts on the vessel during the ejection of the payload, on the vehicle frame cannot be mitigated.

With the foregoing circumstances in view, the present invention has as an object thereof the provision of a haulage vehicle that further improves the stability of operation during ejection of a payload.

Means for Solving the Problem

To resolve the above-described problem, the present invention is characterized in that, in a haulage vehicle including a vehicle frame that travels by wheels, a vessel that is mounted tiltably on the vehicle frame and is to be loaded with a payload as an object to be hauled, hoist cylinders that are disposed elescopically between the vessel and the vehicle frame and extends to tilt the vessel with respect to the vehicle frame when ejecting the payload from the vessel, a hydraulic power source that produces pressurized oil to be supplied to the hoist cylinders, a control valve device that is arranged between the hydraulic power source and the hoist cylinders and opens or closes a valve for supplying or discharging the pressurized oil to or from the hoist cylinders, a controller that performs open or closure control on the control valve device, and a tilt angle detector that detects a tilt angle of the vessel with respect to the vehicle frame, the controller comprises a down assist control section configured to compare a down assist performing angle, which is a tilt angle preset to determine whether negative pressure control processing needs to be performed for offsetting a force applied in a direction that would cause the hoist cylinders to extend, with the detected tilt angle and, if the detected tilt angle is determined to be equal to or greater than the down assist performing angle, to output a control valve signal to the control valve device so that the valve is opened to forcibly discharge pressurized oil from the hoist cylinders.

Advantageous Effects of the Invention

According to the present invention, the hoist cylinders can be prevented from being excessively pulled because pressurized oil is forcibly discharged from the hoist cylinders to retract the hoist cylinders if the tilt angle of the vessel is equal to or greater than the down assist performing angle. As a consequence, it is possible to provide a haulage vehicle that can further improve the stability of operation during ejection of a payload. Problems, configurations and advantageous effects other than those described above will become apparent by the following description of an embodiment.

MODES FOR CARRYING OUT THE INVENTION

The embodiment of the present invention will hereinafter be described in detail based on the drawings. Throughout all the figures for describing the embodiment, members having the same functions are designated by assigning the same or similar numerals or signs, and their repeated descriptions are omitted. In the following embodiment, descriptions of the same or similar elements will not be repeated in principle unless specifically needed.

Figure 1:
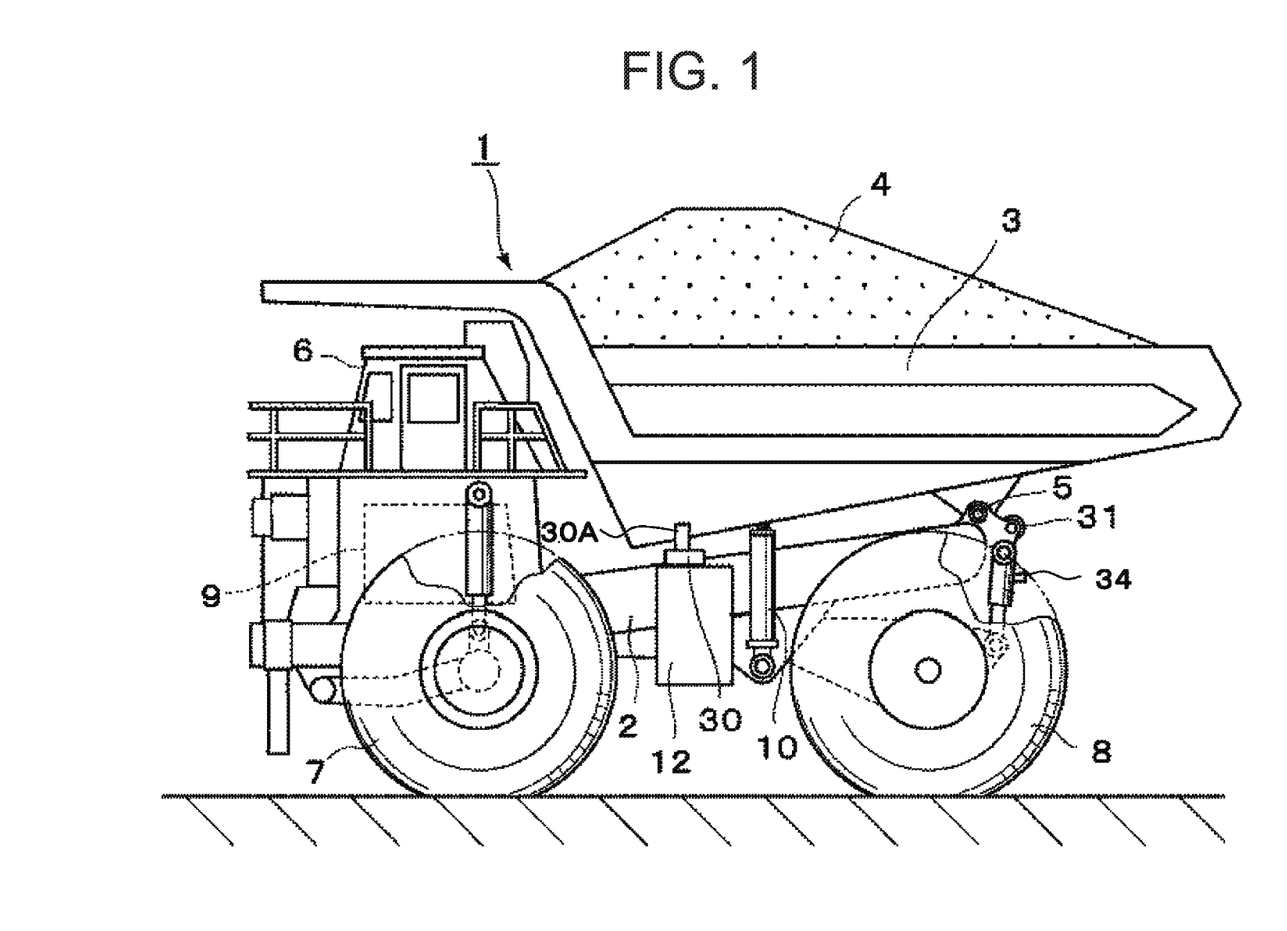
FIG. 1 is an external side view of a dump truck according to the embodiment with a vessel thereof being in a rested state.
Figure 2:
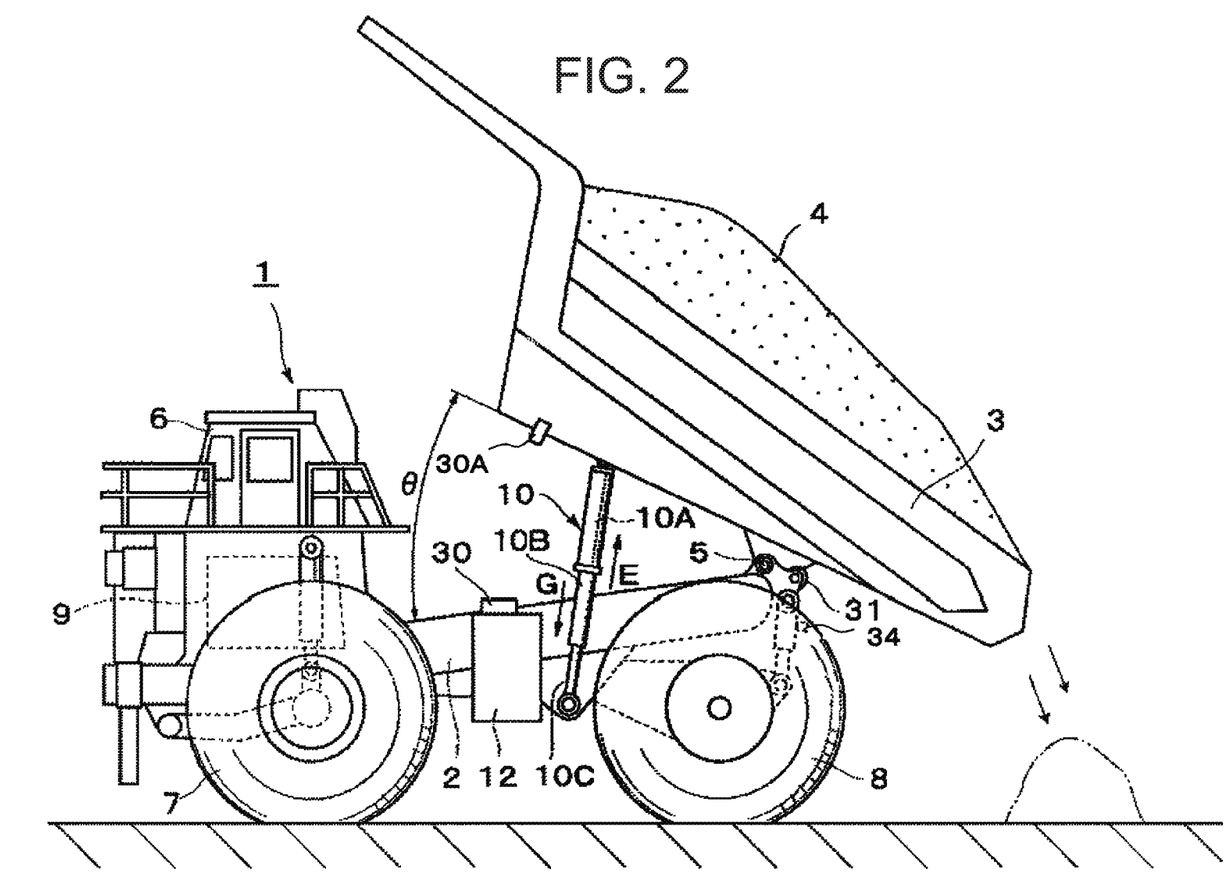
FIG. 2 is an external side view of the dump truck with the vessel thereof being at a highest point (with a tilt angle thereof being an upper limit angle).
Figure 3:
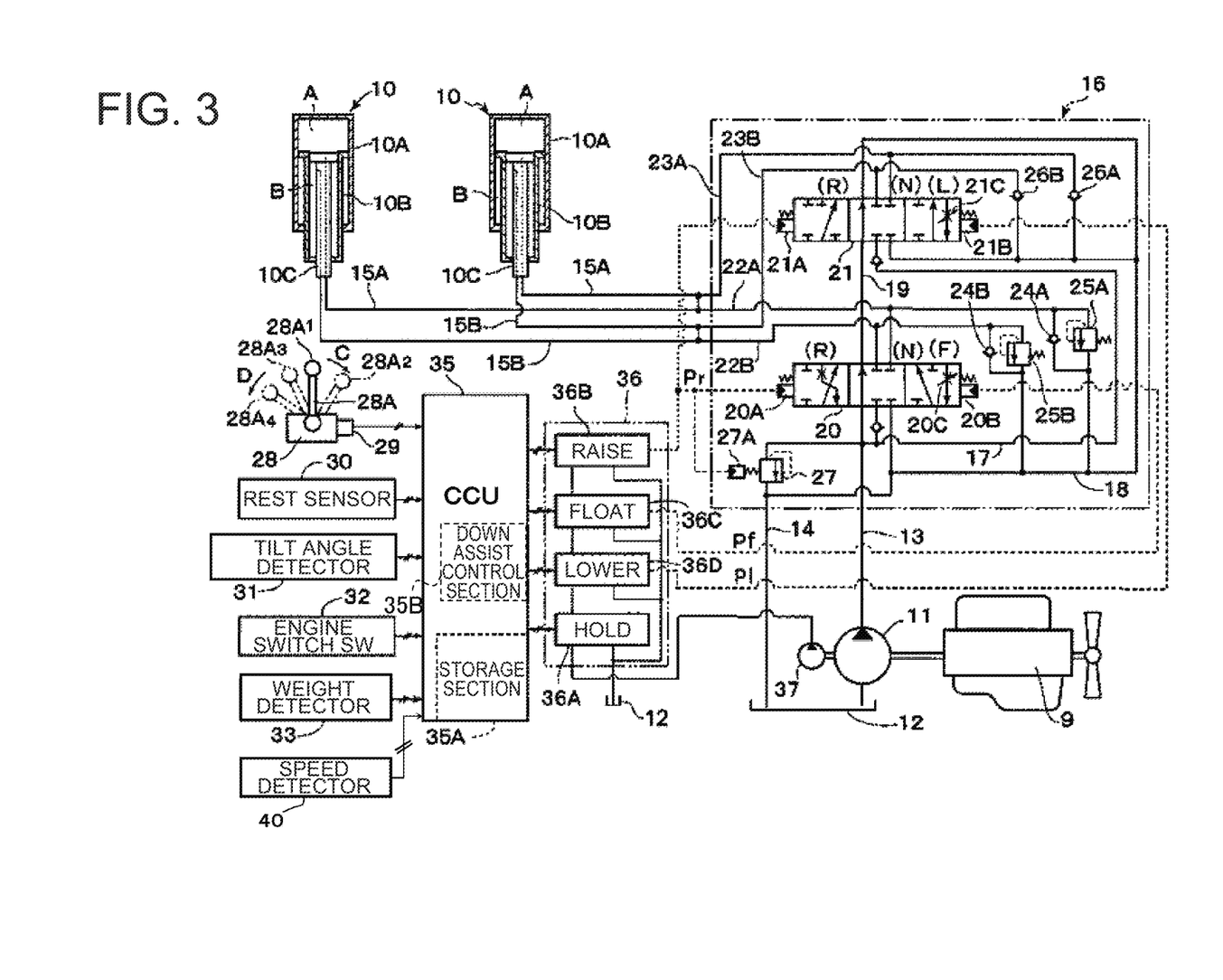
FIG. 3 is a functional block diagram illustrating a schematic configuration of a drive system in the dump truck.
Figure 4:
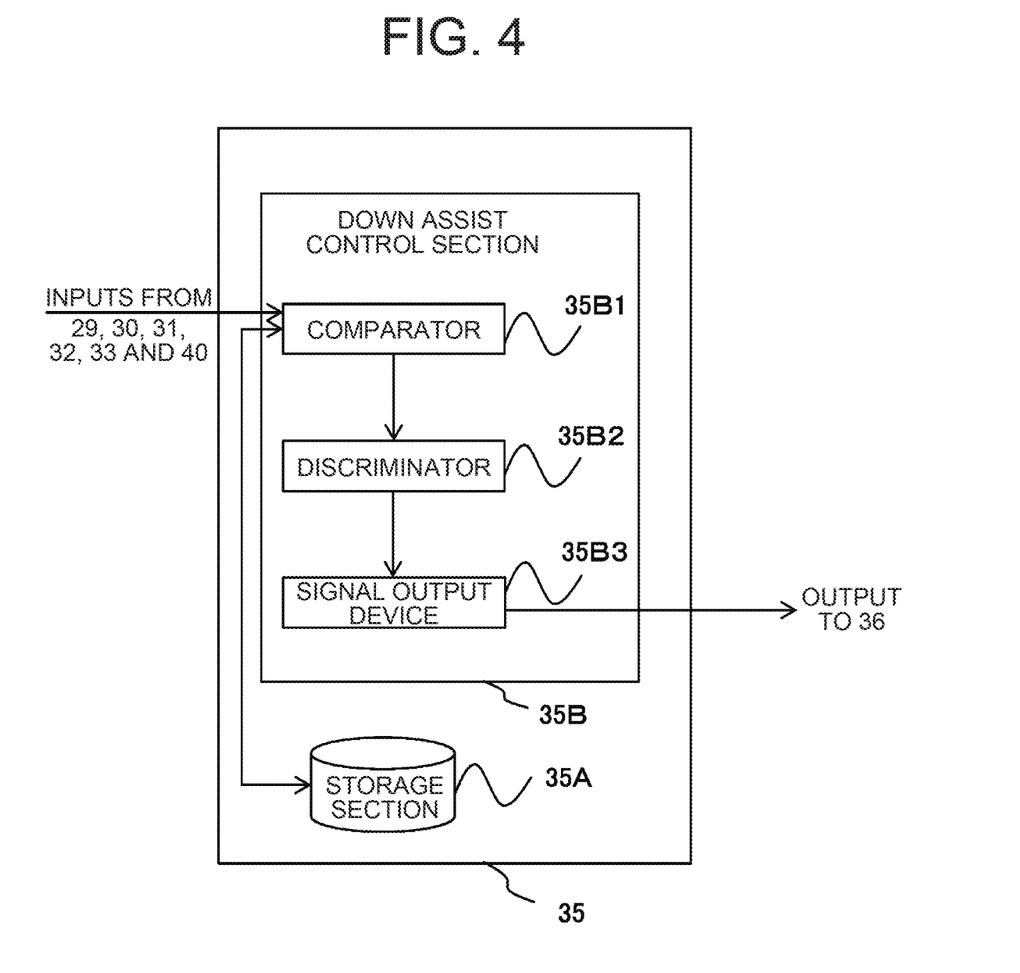
FIG. 4 is a functional block diagram illustrating an internal configuration of a CCU.

With reference to FIG. 1 through FIG. 4, a description will first be made about a schematic configuration of a mining haulage vehicle (hereinafter referred to as "the dump truck") according to this embodiment. FIG. 1 is an external side view of a dump truck according to the embodiment with a vessel thereof being in a rested state. FIG. 2 is an external side view of the dump truck with the vessel thereof being at a highest point (with a tilt angle thereof being an upper limit angle). FIG. 3 is a functional block diagram illustrating a schematic configuration of a drive system in the dump truck. FIG. 4 is a functional block diagram illustrating an internal configuration of a CCU.

The dump truck 1 of FIGS. 1 and 2 includes a vehicle frame 2 having a solid frame structure, a vessel 3 tiltably (raisably and lowerably) mounted on the vehicle frame 2, and below-described front wheels 7 and rear wheels 8 secured on the vehicle frame 2.

The vessel 3 is a container in which a heavy payload 4 such as, for example, crushed rock or earth is to be loaded. The vessel 3 is pivotally (tiltably) connected at a rear bottom part thereof to the side of a rear end of the vehicle frame 2 via connecting pins 5.

In addition, the vessel 3 is also connected at a bottom part thereof to the vehicle frame 2 via telescopic hoist cylinders 10.

The vessel 3 pivots (rises and lowers) in an up-down direction on the side of a front section thereof about the positions of the connecting pins 5 as fulcrums by extending or retracting the hoist cylinders 10. As a consequence, the vessel 3 pivots between a haul position (a state that the vessel has come to rest) illustrated in FIG. 1 and an eject position (a state that the vessel has tilted) illustrated in FIG. 2. In the eject position, the payload 4 loaded in the vessel 3 is ejected to a predetermined unloading site such that the payload 4 slides down from the rearwardly-tilted vessel 3.

On a front section of the vehicle frame 2, a cab 6 is disposed. The cab 6 forms an operation compartment which an operator of the dump truck 1 enters and exits, and inside the operation compartment, an operator's seat, accelerator pedal, brake pedal and steering wheel (all not shown), a below-described control lever 28A and engine switch (SW) 32 (see FIG. 3), and the like are arranged.

The front wheels 7 make up steering wheels to be steered (subjected to steering operation) by the operator of the dump truck 1.

The rear wheels 8 make up driving wheels for the dump truck 1, and are rotationally driven by a travel drive (not shown).

The dump truck 1 further includes an engine 9 as a prime mover. The engine 9 is located underneath the cab 6 and is disposed in the vehicle frame 2, and rotationally drives a hydraulic pump 11, which is illustrated in FIG. 3, and the like.

The hoist cylinders 10 are each configured of a multi-stage (for example, two-stage) hydraulic cylinder. Described specifically, the hoist cylinders 10 are each configured, as illustrated in FIG. 3, of an outer cylindrical portion 10A located on an outer side, an inner cylindrical portion 10B telescopically disposed in the outer cylindrical portion 10A and dividing the interior of the outer cylindrical portion 10A into an upper oil chamber A and a lower oil chamber B, and a piston rod 10C telescopically disposed in the inner cylindrical portion 10B.

When pressurized oil has been supplied from the hydraulic pump 11 into the oil chambers A as will be described subsequently herein, the piston rods 10C downwardly extend so that the hoist cylinders 10 cause the vessel 3 to tilt (pivot) diagonally rearward about the connecting pins 5 as fulcrums (see FIG. 2). When pressurized oil (oil fluid) has been supplied from the hydraulic pump 11 into the oil chambers B, on the other hand, the piston rods 10C retract so that the hoist cylinders 10 cause the vessel 3 to pivot downward to the lowered haul position (see FIG. 1) about the connecting pins 5 as fulcrums.

With reference to FIG. 3, a description will next be made about a hydraulic circuit for driving the hoist cylinders 10.

Together with a hydraulic oil reservoir 12 (hereinafter called "the reservoir 12"), the hydraulic pump 11 makes up a hydraulic power source. As illustrated in FIGS. 1 and 2, the reservoir 12 is located underneath the vessel 3 and is secured on a side wall of the vehicle frame 2. Now, hydraulic oil (oil fluid) received in the reservoir 12 is drawn into the hydraulic pump 11 when the hydraulic pump 11 is rotationally driven by the engine 9. From a delivery side of the hydraulic pump 11, pressurized oil of high pressure is delivered into a pump line 13. On the other hand, return oil from the hoist cylinders 10 is drained to the reservoir 12 via a reservoir line 14 of low pressure.

Designated at signs 15A,15B are a pair of hydraulic lines connected to the oil chambers A and B of each hoist cylinder 10, respectively. These hydraulic lines 15A,15B are connected to the hydraulic power source (hydraulic pump 11, reservoir 12), respectively, via a below-described control valve device 16, supply pressurized oil from the hydraulic pump 11 to the oil chambers A,B of the hoist cylinders 10, and drain pressurized oil from the oil chambers A,B to the reservoir 12.

The control valve device 16 is arranged between the hydraulic pump 11 and reservoir 12 and the hoist cylinders 10. As illustrated in FIG. 3, the control valve device 16 is generally configured of a high-pressure side oil passage 17, a low-pressure side oil passage 18, a bypass oil passage 19, a first directional control valve 20, and a second directional control valve 21. In this embodiment, the first directional control valve 20 and the second directional control valve 21 are connected together in parallel to each other via the high-pressure side oil passage 17, low-pressure side oil passage 18 and bypass oil passage 19.

In the control valve device 16, the high-pressure side oil passage 17 is connected to the delivery side of the hydraulic pump 11 via the pump line 13, while the low-pressure side oil passage 18 is connected to the reservoir 12 via the reservoir line 14. The bypass oil passage 19 in the control valve device 16 allows the high-pressure side oil passage 17 and the low-pressure side oil passage 18 to communicate to each other when the directional control valves 20,21 are in a neutral position (N). As a consequence, the hydraulic pump 11 is brought into an unloaded state, and its delivery pressure (the pressure inside the pump line 13) is maintained in a low-pressure state which is close to the pressure of the reservoir.

On an output side of the first directional control valve 20, a pair of actuator-side oil passages 22A,22B is arranged. The actuator-side oil passages 22A,22B are connected to the oil chambers A,B of each hoist cylinder 10 via the hydraulic lines 15A,15B, respectively. On an output side of the second directional control valve 21, a pair of actuator-side oil passages 23A,23B is arranged. The actuator-side oil passages 23A,23B are connected to the oil chambers A,B of each hoist cylinder 10 via the hydraulic lines 15A,15B, respectively.

The directional control valves 20,21 in the control valve device 16 are each configured, for example, of a hydraulically-piloted, 6-port/3-position directional control valve. A pilot pressure generator 36 is connected to an output side of a hydraulic control controller (CCU) 35, and this pilot pressure generator 36 converts electrical control signals from the CCU 35 to pilot pressures Pr,Pf,Pi which are pressure signals. For this purpose, the pilot pressure generator 36 includes three operation sections consisting of a raise operation section 36B, a float operation section 36C and a lower operation section 36D. The first directional control valve 20 has a pair of hydraulic pilot ports 20A,20B.

The first directional control valve 20 is switched from a neutral position (N) to a raise position (R) when the pilot pressure Pr is supplied to the hydraulic pilot port 20A as will be described subsequently herein, but is switched from the neutral position (N) to a float position (F) when the pilot pressure Pf is supplied to the hydraulic pilot port 20B as will be described subsequently herein.

As illustrated in FIG. 4, the CCU 35 has a storage section 35A and a down assist control section 35B. The storage section 35A stores data that are needed for down assist control of the vessel 3. The down assist control section 35B includes a comparator 35B1, a discriminator 35B2, and a signal output device 35B3. The comparator 35B1 compares a down assist performing angle, which is a tilt angle preset to determine whether negative pressure control processing needs to be performed for offsetting a force applied in a direction that would cause the hoist cylinders 10 to extend, with a tilt angle detected by the tilt angle detector 31. If the discriminator 35B2 determines that the detected tilt angle is to be equal to or greater than the down assist performing angle, the signal output device 35B3 outputs a control valve signal to the control valve device so that the valve for forcibly discharging pressurized oil from the hoist cylinders is opened.

As illustrated in FIG. 3, the first directional control valve 20 has a variable restrictor portion 20C. If a signal for restriction control through duty control is outputted from the CCU 35 to the float operation section 36C, this variable restrictor portion 20C responsive to the signal fulfills a function to restrict the flow rate of oil fluid as will be described subsequently herein. Insofar as no restriction control signal is outputted from the CCU 35, the variable restrictor portion 20C does not restrict the flow rate of oil fluid.

The second directional control valve 21 has a pair of hydraulic pilot ports 21A,21B. The second directional control valve 21 is switched from a neutral position (N) to a raise position (R) when the pilot pressure Pr is supplied to the hydraulic pilot port 21A as will be described subsequently herein, but is switched from the neutral position (N) to a lower position (L) when the pilot pressure Pi is supplied to the hydraulic pilot port 21B as will be described subsequently herein.

As illustrated in FIG. 3, the second directional control valve 21 has a variable restrictor portion 21C. If a signal for restriction control through duty control is outputted from the CCU 35 to the lower operation section 36D, this variable restrictor portion 21C responsive to the signal fulfills a function to restrict the flow rate of oil fluid as will be described subsequently herein. Insofar as no restriction control signal is outputted from the CCU 35, the variable restrictor portion 21C does not restrict the flow rate of oil fluid.

Now, a description will be made about a case where the control valve device is in a hold position. Described specifically, the first and second directional control valves 20,21 are each placed in the neutral position (N) so that the control valve device 16 is placed in the hold position where the respective hoist cylinders 10 are kept immobile. In this hold position, the supply and discharge of pressurized oil to and from the respective hoist cylinders 10 via the actuator-side oil passages 22A,22B and actuator-side oil passages 23A, 23B are cut off.

Further, a description will be made about a case where the control valve device 16 is to be placed in a raise position. In this case, the first and second directional control valves 20,21 are both switched from the neural position (N) to the raise position (R). When the first and second directional control valves 20,21 are switched to the raise position (R) first, pressurized oil is supplied from the hydraulic pump 11 into the oil chambers A of the respective hoist cylinders 10 via the pump line 13, the high-pressure side oil passage 17, the first and second directional control valves 20,21, the actuator-side oil passages 22A,23A and the hydraulic lines 15A. At this time, owing to the switching of the first directional control valve 20 to the raise position (R), oil fluid is returned from the oil chambers B to the reservoir 12 via the hydraulic lines 15B, the actuator-side oil passage 22B, the first directional control valve 20, the low-pressure side oil passage 18, and the reservoir line 14.

As a consequence, the piston rods 10C of the respective hoist cylinders 10 are caused to extend by the pressurized oil in the oil chambers A, and therefore raise the vessel 3 to the eject position illustrated in FIG. 2. Described specifically, the first and second directional control valves 20,21 in the control valve device 16 are both placed in the raise position (R) at this time so that the respective hoist cylinders 10 are caused to extend in a direction of arrow E in FIG. 2 under hydraulic forces and raise the vessel 3 upward.

A description will be made about a case where the control valve device 16 is to be placed in a float position, on the other hand. In this case, the first directional control valve 20 is switched from the neutral position (N) to the float position (F). On the other hand, the second directional control valve 21 is held in the neutral position (N). If the first directional control valve 20 is now placed in the float position (F), the actuator-side oil passage 22A is connected to the low-pressure side oil passage 18 and reservoir line 14 via the first directional control valve 20. On the other hand, the actuator-side oil passage 22B is connected to the low-pressure side oil passage 18 and reservoir line 14 via a check valve 24B which will be described subsequently herein, and the other actuator-side oil passage 23B is connected to the low-pressure side oil passage 18 and reservoir line 14 via a check valve 26B which will be described subsequently herein.

As a consequence, each hoist cylinder 10 retracts in a direction of arrow G in FIG. 2 according to a load (tare weight) from the vessel 3, whereby oil fluid is discharged from the oil chamber A toward the reservoir 12 via the hydraulic line 15A, actuator-side oil passage 22A and first directional control valve 20, and at the same time oil fluid is replenished from the reservoir 12 into the oil chamber B via the check valves 24B,26B, actuator-side oil passages 22B, 23B and hydraulic lines 15B as will be described subsequently herein. In this state, the first directional control valve 20 is, therefore, placed in the float position (F) that permits free fall for the vessel 3. The first directional control valve 20 placed in the float position (F) is called a "float solenoid valve".

In addition, a description will be made about a case where the control valve device 16 is to be placed in a lower position. In this case, the first directional control valve 20 is returned to the neutral position (N), and the second directional control valve 21 is switched from the neural position (N) to the lower position (L). When the second directional control valve 21 is placed in the lower position (L), pressurized oil is supplied from the hydraulic pump 11 into the oil chambers B of the respective hoist cylinders 10 via the pump line 13, the high-pressure side oil passage 17, the second directional control valve 21, the actuator-side oil passage 23B and the hydraulic lines 15B. Further, oil fluid is returned from the oil chambers A to the reservoir 12 via the hydraulic lines 15A, the actuator-side oil passage 23A, the second directional control valve 21, the low-pressure side oil passage 18, and the reservoir line 14.

By the pressurized oil supplied into the oil chambers B, the inner cylindrical portions 10B, therefore, retract together with the piston rods 10C into the outer cylindrical portions 10A, so that the respective hoist cylinders 10 cause the vessel 3 to pivot downward into the haul position illustrated in FIG. 1 under hydraulic forces thereof. Described specifically, in this state, the second directional control valve 21 is placed in the lower position (L), and the respective hoist cylinders 10 retract in the direction of arrow G in FIG. 2 under hydraulic forces and hence lower the vessel 3 to a position where the vessel 3 rests on the vehicle frame 2. The second directional control valve 21 placed in the lower position (L) is called a "down solenoid valve".

Signs 24A,24B designate makeup check valves arranged on the side of the first directional control valve 20. As illustrated in FIG. 3, these check valves 24A,24B are arranged between the actuator-side oil passages 22A,22B and the low-pressure side oil passage 18 while bypassing the first directional control valve 20. The check valves 24A,24B allow the oil fluid in the reservoir 12 to flow from the low-pressure side oil passage 18 toward the oil chambers A,B of the hoist cylinders 10 via the actuator-side oil passages 22A,22B and hydraulic lines 15A,15B, but inhibit oil fluid from flowing in a reverse direction. By the oil fluid replenished via the check valves 24A,24B, it is thus possible to avoid development of a negative pressure in the oil chambers A,B of the hoist cylinders 10.

Signs 25A,25B designate overload prevention relief valves arranged in the control valve device 16. These relief valves 25A,25B are arranged between the actuator-side oil passages 22A,22B and the low-pressure side oil passage 18 while bypassing the first directional control valve 20, and are connected in parallel with the check valves 24A,24B. If any excessive pressure acts in a retracting direction on the hoist cylinders 10, one (25A) of the relief valves 25A, 25B opens to relieve the excessive pressure on the sides of the oil chambers A. If any excessive pressure acts in an extending direction on the hoist cylinders 10, on the other hand, the other relief valve 25B opens to relieve the excessive pressure on the sides of the oil chambers B.

Signs 26A,26B designate makeup check valves arranged on the side of the second directional control valve 21 in the control valve device 16. These check valves 26A,26B are arranged between the actuator-side oil passages 23A,23B and the low-pressure side oil passage 18 while bypassing the second directional control valve 21. The check valves 26A, 26B allow the oil fluid in the reservoir 12 to flow from the low-pressure side oil passage 18 toward the oil chambers A,B of the hoist cylinders 10 via the actuator-side oil passages 23A, 23B and hydraulic lines 15A, 15B, but inhibit oil fluid from flowing in a reverse direction. As a consequence, the check valves 26A,26B replenish oil fluid to the oil chambers A,B of the hoist cylinders 10.

Numeral 27 designates a relief valve, which is arranged between the high-pressure side oil passage 17 and the low-pressure side oil passage 18 in the control valve device 16 and can be changed in relief setting pressure. This relief valve 27 sets the maximum delivery pressure of the hydraulic pump 11 and, if any excessive pressure higher than the maximum delivery pressure arises, opens to relieve the excessive pressure to the side of the reservoir 12. This relief valve 27 has a set pressure adjusting portion 27A to which the pilot pressure Pr is supplied, and by the pilot pressure Pr, the preset relief pressure is switched to the setting of high pressure.

Described specifically, the relief valve 27 sets the delivery pressure of the hydraulic pump 11 high by raising the preset relief pressure when the directional control valves 20,21 have been switched to the raise position (R) by the supply of the pilot pressure Pr. When the supply of the pilot pressure Pr is cut off, on the other hand, the relief setting pressure is switched to low pressure so that the relief valve 27 suppresses the pressure of pressurized oil from rising beyond necessity. Therefore, the hydraulic pump 11 is set low in delivery pressure when the first and second directional control valves 20,21 have been switched to a position other than the raise position (R), that is, have been switched to the neutral position (N), the float position (F) or the lower position (L).

Referring to FIG. 3, a description will next be made about an operation device for supplying pilot pressures to the first and second directional control valves 20,21 that make up the control valve device 16.

Numeral 28 designates an operation lever device as an operation device that performs switching operation of the control lever device 16. The operation lever device 28 is configured, for example, of an electrical lever device, and has the operation lever 28A to be manually tilted and operated by the operator in the cab 6. Corresponding to each switching position of the control valve device 16, this operation lever 28A is tilted to one of a hold position, a raise position, a float position and a lower position.

In this embodiment, the operation lever 28A has a first return position 28A1 indicated by solid lines in FIG. 3 and a second return position 28A3 indicated by two-dot chain lines there, and is normally placed in the first return position 28A1 that corresponds to the hold position. When this operation lever 28A is tilted in a direction of arrow C from the first return position 28A1 indicated by the solid lines in FIG. 3, the operation lever 28A assumes a first tilt position 28A2 indicated by two-dot chain lines and the pilot pressure Pr is outputted from the raise operation section 36B of the pilot pressure generator 36. If the operator releases the hand from the operation lever 28A in the state of the first tilt position 28A2, the operation lever 28A automatically returns under the force of a return spring (not shown) to the first return position 28A1 indicated by the solid lines in FIG. 3.

When the operator tilts the operation lever 28A against the return spring from the first return position 28A1 indicated by the solid lines in FIG. 3 to the second return position 28A3 indicated by the two-dot chain lines there, on the other hand, the operation lever 28A is held by itself in the second return position 28. At this time, the pilot pressure Pf is outputted from the float operation section 36C as will be described subsequently herein.

Further, when the operation lever 28A stilted from the second return position 28A3 in a direction of arrow D, the operation lever 28A assumes a second tilt position 28A4 indicated by two-dot chain lines, and the pilot pressure Pi is outputted from the lower operation section 36D as will be described subsequently herein. If the operator releases the hand from the operation lever 28A in the state of the second tilt position 28A4, the operation lever 28A automatically returns under the force of another return spring (not shown) to the second return position 28A3.

Numeral 29 designates a lever sensor as an operation detecting means attached to the operation lever device 28. This lever sensor 29 detects the position of the operation lever 28A as operated by the operator, and outputs a detection signal to the CCU 35 as will be described subsequently herein. This lever sensor 29 makes up the operation detecting means, and detects at which one of the above-described respective switching positions the control valve device 16 switched by the operation lever device 28 is located.

Numeral 30 designates a rest sensor that detects whether the vessel 3 rests on the vehicle frame 2. This rest sensor 30 is configured of a contact-type sensor located above the reservoir 12 and arranged on the side of the vehicle frame 2 as illustrated in FIGS. 1 and 2, and detects whether a projection 30A disposed as a detection object on the side of the vessel 3 is in contact or apart. Therefore, the rest sensor 30 makes up a tilted state detector that detects the movement of the vessel 3 on the vehicle frame 2 (how much the vessel 3 has been tilted), and outputs a detection signal to the CCU 35 as will be described subsequently herein.

Numeral 31 designates a tilt angle detector as another tilted state detector adopted in this embodiment. The tilt angle detector 31 is located near one of the connecting pins 5 and is arranged on the side of a rear section of the vehicle frame 2 as illustrated in FIGS. 1 and 2. This tilt angle detector 31 detects the tilt angle of the vessel 3 as an angle θ, which is exemplified in FIG. 2, with respect to the vehicle frame 2, and outputs a detection signal to the CCU 35 as will be described subsequently herein.

Numeral 32 designates the engine switch arranged in the cab 6, and the engine switch 32 makes up a start switch for the engine 9. The operator who sits on an operator's seat in the cab 6 manually operates the engine switch 32 to start or stop the engine 9.

Numeral 33 designates a weight detector as a load detector adopted in this embodiment. This weight detector 32 is configured including a pressure sensor 34 arranged on a rear suspension 8A on the side of one of the rear wheels 8 as illustrated in FIGS. 1 and 2, and measures any change in weight on the side of the vessel 3 to detect whether a payload (the payload 4) is loaded in the vessel 3. Therefore, the pressure sensor 34 serves as a weight detecting element in the weight detector 33.

Numeral 40 designates a speed detector. As this speed detector 40, a wheel rotational speed detector that detects, for example, the rotational speed of one of the front wheels 7 as driven wheels may be used.

The CCU 35 reads operator's operation details from the operation lever 28A. In the case of an autonomously-traveling dump truck without an operator onboard, operation details are transmitted to the CCU 35 through an unillustrated wireless network. Also inputted to the CCU 35 include information from the rest sensor 30, the information indicating whether the vessel 3 rests, a tilt angle θ of the vessel 3 from the tilt angle detector 31, an engine start instruction from the engine switch 32, the weight of a payload loaded in the vessel 3 from the weight detector 33, a vehicle travel speed from the speed detector 40, and a pressure from a pressure sensor (now shown) arranged on the hydraulic pump 11. The CCU 35 outputs commands to the pilot pressure generator 36 based on these information, and actuates the first and second directional control valves 20,21 and hydraulic pump 11 to control the operation of the hoist cylinders 10.

The dump truck 1 of the above-described configuration travels, with the payload 4 loaded in the vessel 3, to a haul destination, and then extends the hoist cylinders 10 to raise the vessel 3 diagonally rearward. Along the vessel 3 tilted by the raising operation, the payload 4 is ejected to an unloading site. After completion of the ejection operation, the hoist cylinders 10 retract under the tare weight of the vessel 3 or hydraulic control by the hydraulic pump 11 according to manual operation of the operation lever 28A. Hereinafter, lowering under tare weight will be called "tare weight lowering" and lowering by hydraulic pressure will be called "forcible lowering". By the above-described retraction operation of the hoist cylinders 10, the vessel 3 lowers to a position where the vessel 3 rests on the vehicle frame 2.

When the dump truck 1 performs ejection operation as illustrated in FIG. 2, the center of gravity of the payload 4 may shift to a rear part of the vessel 3 which is in a tilted state. Further, if the dump truck 1 attempts to travel after the ejection operation while performing tare weight lowering with the payload 4 still remaining in the vessel 3, an inertial force acts on the vessel 3, whereby a force is applied to the vessel 3 in a direction that the tilt angle would become still greater. As a consequence, a force is applied to the hoist cylinders 10 so that the hoist cylinders 10 extend in the direction of arrow E in FIG. 2. When this force has increased greater than the force acting on the hoist cylinders 10 to retract them under the tare weight, a negative pressure occurs in the hoist cylinders 10. To avoid the occurrence of such a negative pressure, down assist operation that uses forcible lowering operation is performed in this embodiment.

Figure 5:
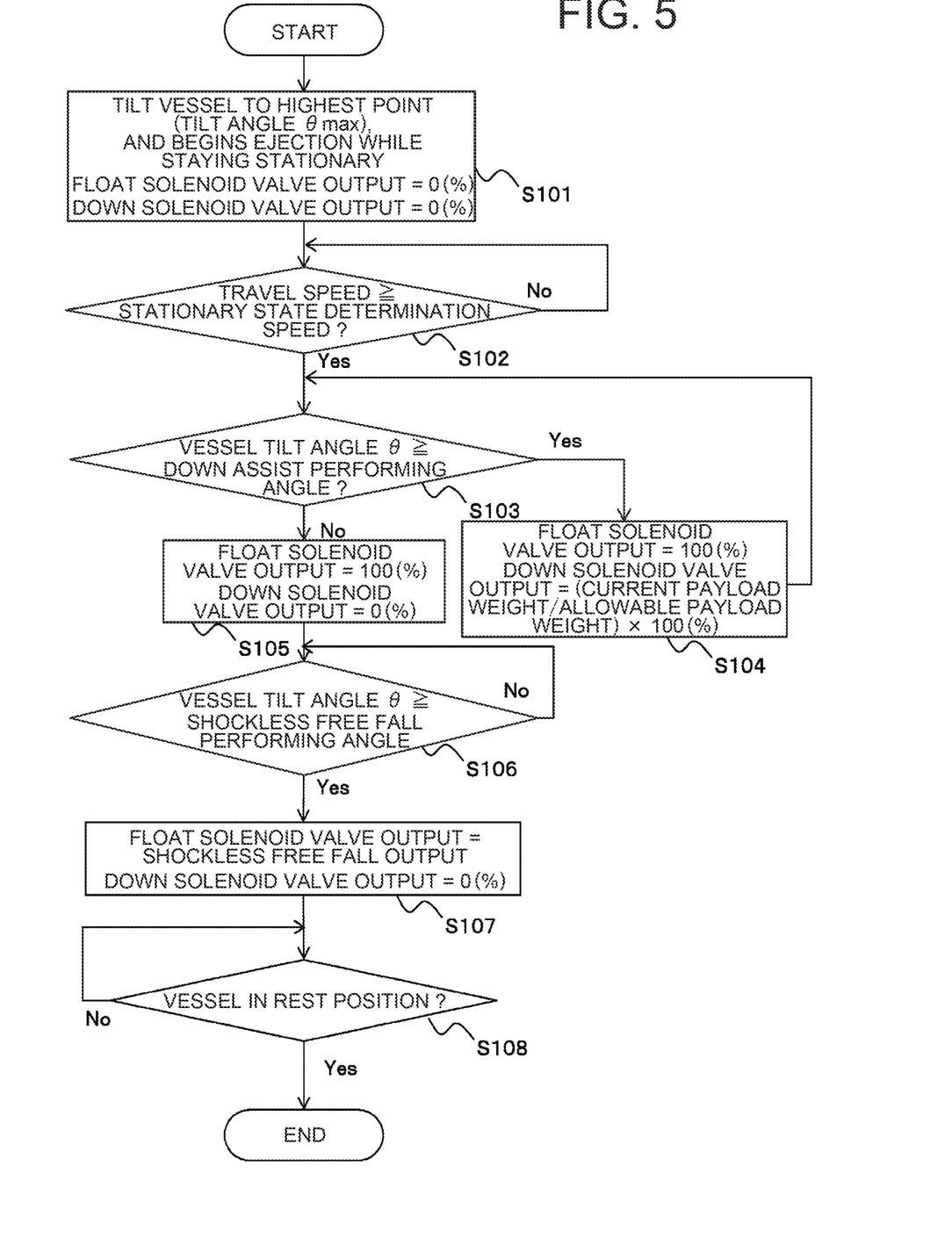
FIG. 5 is a flow chart illustrating a flow of processing of ejection operation by the dump truck that performs down assist operation in this embodiment.
Figure 6:
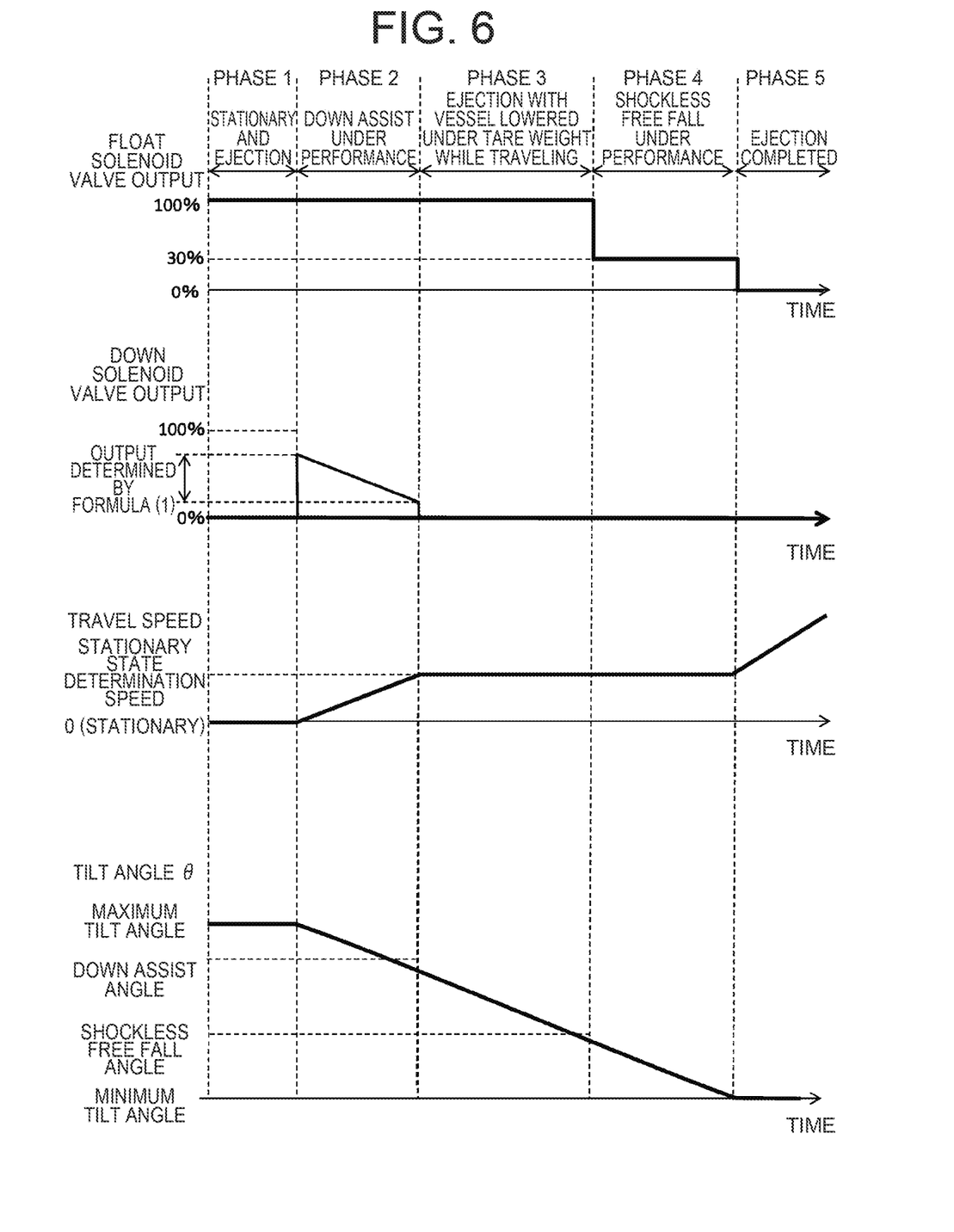
FIG. 6 is a time chart illustrating changes in float solenoid valve output, down solenoid valve output, travel speed and vessel tilt angle during the ejection operation in FIG. 5.

With reference to FIGS. 5 and 6, a description will hereinafter be made about details of control of this down assist operation. FIG. 5 is a flow chart illustrating a flow of processing of ejection operation by the dump truck that performs down assist operation in this embodiment. FIG. 6 is a time chart illustrating changes in float solenoid valve output, down solenoid valve output, travel speed and vessel tilt angle during the ejection operation in FIG. 5.

Hereinafter, a description will be made in the order of the individual steps in FIG. 5. After stopping at an unloading site, the dump truck 1 tilts the vessel 3 to the highest point (with the tilt angle θ thereof being an upper limit angle $\theta_{max}$), the control valve device 16 is placed in the hold position, and the dump truck 1 begins ejection (S101) (Phase 1 in FIG. 6).

As earth is ejected, earth gradually accumulates in a lower edge part of the vessel 3 so that the lower edge part is filled up with earth and no further ejection of earth becomes feasible. Then, the dump truck 1 begins to move forward at a low speed, and ejects earth while traveling.

The CCU 35 has received inputs of a tilt angle θ from the tilt angle detector 31 and a travel speed of the dump truck 1 from the speed detector 40, and determines whether the travel speed from the speed detector 40 has been equal to a stationary state determination speed (for example, 0.5 km/h), which has been preset for determining that the dump truck 1 is stationary, or higher. If the travel speed is lower than the stationary state determination speed (S102/No), the processing returns to step S101.

If the travel speed is equal to or higher than the stop determination speed stationary state determination speed (S102/Yes), the CCU 35 determines whether the tilt angle θ is equal to or greater than a down assist performing angle. If affirmative (S103/Yes), the CCU 35 sets the down solenoid valve output according to the below-described formula (1), and performs down assist operation by forcible lowering operation in addition to tare weight lowering (S104; Phase 2 in FIG. 6). The processing then returns to step S103.

$$\text{Down solenoid valve output}=(\text{current payload weight/allowable payload weight})\times 100[\%] \qquad (1)$$

The dump truck continues ejection while moving forward at a low speed. If the earth remaining in the vessel 3 has decreased, the operator performs operation for allowing the vessel 3 to rest, and the tilt angle θ decreases gradually.

If the tilt angle θ has decreased to smaller than the down assist performing angle (S103/No), the CCU 35 sets the float solenoid valve output at 100% and the down solenoid valve output at 0% to end the down assist operation, and allows the vessel 3 to tilt by tare weight lowering only (S105; Phase 3 in FIG. 6).

The dump truck 1 continues traveling while causing the vessel 3 to pivot in a direction that the tilt angle θ decreases. The CCU 35 determines whether the tilt angle θ of the vessel is equal to or smaller than the preset shockless free fall performing angle. If negative, that is, if the tilt angle θ is greater than the shockless free fall performing angle (S106/No), the dump truck 1 continues the tare weight lowering of the vessel 3 while traveling (Phase 3 in FIG. 6).

If the tilt angle θ of the vessel is determined to have decreased to equal to or smaller than the shockless free fall performing angle (S106/Yes), on the other hand, the CCU 35 sets the float solenoid valve output at a preset shockless free fall output (for example, float solenoid valve output: 30%) (S107), whereby the vessel 3 is allowed to tilt with its tilt speed being gradually reduced until the vessel 3 comes to rest (S108: Phase 4 in FIG. 6). The processing in step S108 is continued until the vessel 3 comes to rest (S108/No).

If the vessel 3 has come to rest (S108/Yes), the CCU 35 sets the float solenoid valve output at 0%, the down solenoid valve output at 0%, and the first directional control valve 20 and second directional control valve 21 into the neutral position to end the ejection operation, and the dump truck 1 continues traveling.

According to this embodiment, if the tilt angle of the vessel has exceeded the preset down assist performing angle while the dump truck is traveling at the stationary state determination speed or higher, forcible lowering operation of the vessel is performed in addition to its tare weight lowering. It is, therefore, possible to mitigate effects of a negative pressure that acts on the hoist cylinders during ejection operation.

This embodiment does not restrict the present invention, and modified embodiments within a range not departing from the spirit of the present invention fall within the technical scope of the present invention.

In the above-described embodiment, during down assist operation, for example, the down solenoid valve output is changed as needed according to the current payload weight, but the down solenoid valve output may be set at 100%. As a consequence, the CCU is no longer needed to perform control for changing the down solenoid valve output during the performance of a down assist, and therefore the processing load on the CCU can be reduced.

In the above-described embodiment, the situation that the travel speed has increased to the stationary state determination speed or higher is adopted as a condition for the performance of a down assist. It may, however, be configured to perform a down assist if the tilt angle θ is equal to or greater than the down assist performing angle irrespective of the travel speed, that is, even stationary. In this modification, the processing in step S102 in FIG. 5 can be omitted. As a consequence, effects of a negative pressure acted on the hoist cylinders can be mitigated even if the dump truck is stationary and is performing ejection operation. Further, the haulage vehicle has been described by taking as an example a manned haulage vehicle with an operator on board, but the present invention can also be applied to an autonomously-traveling haulage vehicle that autonomously travels without relying upon steering by an operator.

LEGENDS

1: dump truck, 2: vehicle frame, 3: vessel, 10: hoist cylinders

The invention claimed is:

1. A haulage vehicle including a vehicle frame that travels by wheels, a vessel that is mounted tiltably on the vehicle frame and is to be loaded with a payload as an object to be hauled, hoist cylinders that are disposed telescopically between the vessel and the vehicle frame and extends to tilt the vessel with respect to the vehicle frame when ejecting the payload from the vessel, a hydraulic power source that produces pressurized oil to be supplied to the hoist cylinders, a control valve device that is arranged between the hydraulic power source and the hoist cylinders and opens or closes a valve for supplying or discharging the pressurized oil to or from the hoist cylinders, a controller that performs open or closure control on the control valve device, and a tilt angle detector that detects a tilt angle of the vessel with respect to the vehicle frame, wherein:

the controller comprises a down assist control section configured to compare a down assist performing angle, which is a tilt angle preset to determine whether negative pressure control processing needs to be performed for offsetting a force applied in a direction that would cause the hoist cylinders to extend, with the detected tilt angle and, if the detected tilt angle is determined to be equal to or greater than the down assist performing angle, to output a control valve signal to the control valve device so that the valve is opened to forcibly discharge pressurized oil from the hoist cylinders.

2. The haulage vehicle according to claim 1, further comprising:

a weight detector that detects a weight of the payload loaded on the vessel, wherein the control valve signal that the down assist control section of the controller outputs commands a degree of opening of the valve, which corresponds to a percentage of the weight of the payload as detected by the weight detector to an allowable weight for payloads to be loaded on the vessel.

3. The haulage vehicle according to claim 1, further comprising:

a speed detector that detects a travel speed of the haulage vehicle, wherein the controller is configured to output the control valve signal if the travel speed detected by the speed detector is equal to or greater than a speed threshold preset to determine a stationary state of the haulage vehicle and the tilt angle of the vessel is equal to or greater than the down assist performing angle.

* * * * *